(12) United States Patent
Schneider

(10) Patent No.: US 7,016,792 B2
(45) Date of Patent: Mar. 21, 2006

(54) TRANSDUCER COMPRISING A CONNECTED DATA MEMORY

(75) Inventor: Jochen Schneider, Ober-Ramstadt (DE)

(73) Assignee: Hottinger Baldwin Messtechnik GmbH, Darmstadt (DE)

( * ) Notice: Subject to any disclaimer, the term of this patent is extended or adjusted under 35 U.S.C. 154(b) by 13 days.

(21) Appl. No.: 10/481,506

(22) PCT Filed: Jun. 20, 2002

(86) PCT No.: PCT/EP02/06836

§ 371 (c)(1),
(2), (4) Date: Dec. 19, 2003

(87) PCT Pub. No.: WO03/001155

PCT Pub. Date: Jan. 3, 2003

(65) Prior Publication Data

US 2004/0204896 A1    Oct. 14, 2004

(30) Foreign Application Priority Data

Jun. 22, 2001  (DE) ................................ 101 30 215

(51) Int. Cl.
*G01R 15/00*    (2006.01)

(52) U.S. Cl. ...................................................... 702/57

(58) Field of Classification Search .................. 702/57, 702/64, 65, 81, 104, 182, 188, 189
See application file for complete search history.

(56) References Cited

U.S. PATENT DOCUMENTS

| | | | |
|---|---|---|---|
| 3,911,205 A | 10/1975 | Giebler et al. | 178/2 R |
| 4,845,649 A | 7/1989 | Eckardt et al. | 702/104 |
| 5,008,843 A | 4/1991 | Poelsler et al. | 702/104 |
| 5,355,129 A | 10/1994 | Baumann | 340/870.04 |
| 5,940,510 A * | 8/1999 | Curry et al. | 705/65 |

FOREIGN PATENT DOCUMENTS

| | | |
|---|---|---|
| DE | 2302024 | 7/1974 |
| DE | 3535642 | 7/1986 |
| DE | 3743846 | 7/1989 |
| DE | 4114073 | 11/1992 |
| DE | 4114921 | 11/1992 |

(Continued)

*Primary Examiner*—Michael Nghiem
(74) *Attorney, Agent, or Firm*—W. F. Fasse; W. G. Fasse

(57) ABSTRACT

The invention relates to a transducer (4) and a method for determining measuring values and for exchanging data between an evaluation device and the transducer which are connected by at least two connecting lines (2B, 2A; 11, 12). Data which is predetermined by the evaluation device is read-out of the data memory and/or rewritten into the same via at least two connecting lines (2A, 2B; 12) which have the same electrical potential in the measuring operation. The data memory is embodied as a data memory module (5) and contains a current limitation circuit (2) by which the system can be switched from the measuring mode to a communication mode for data transfer. The lines (2A, 2B; 11, 12) are thus provided for switching into the communication mode and for exchanging data during the measuring operation, and for feeding the transducer (4) and/or for detecting measuring values.

13 Claims, 2 Drawing Sheets

FOREIGN PATENT DOCUMENTS

| | | |
|---|---|---|
| DE | 4129577 | 3/1993 |
| DE | 29521356 | 2/1997 |
| DE | 19621375 | 12/1997 |
| DE | 19707708 | 9/1998 |
| DE | 29521924 | 11/1998 |
| DE | 19856090 | 7/2000 |
| DE | 20018871 | 3/2001 |
| DE | 19957088 | 5/2001 |
| EP | 0233176 | 8/1987 |
| EP | 0324067 | 7/1989 |
| EP | 0541573 | 5/1993 |
| EP | 0845660 | 6/1998 |
| EP | 09926470 | 6/1999 |

\* cited by examiner

TRANSDUCER COMPRISING A CONNECTED DATA MEMORY

FIELD OF THE INVENTION

The invention relates to a measured values pick-up with a connected data memory and to a method for the acquisition of measured values and for the exchange of data by a measured values pick-up.

BACKGROUND OF THE INVENTION

In measuring devices with comfortable display possibilities or in measured data processing systems it is frequently required to spatially separate the measured value pick-up including the actual physical-to-electrical transducer from an evaluating circuit or device for measured signal processing. Thereby, the measured value pick-up and the evaluating circuit are, as a rule, connected to each other by electrical conductors. The electrical conductors must partially bridge distances of a few hundred meters. However, frequently it is only the environmental influences which require a spatial separation of the measured value pick-up from the evaluating devices. Particularly in connection with such spatial distances it is thus required that the evaluating devices are adapted to the correct characteristic and calibration values of the physical-to-electrical transducers in order to make possible a standardized measured value display or a further processing.

For these purposes numerous measured values pick-ups are realized with an analog electric interface. This applies particularly to pick-up methods in which the measured value is transformed at the pick-up without active electronic circuits into an electrical signal, whereupon the signal processing takes place in a separate circuit or in the evaluating device. In this case the characteristic values of the physical-electrical transducer or pick-up are held generally in a separate data sheet or in a calibration protocol. This information is necessary in any case in a separate circuit or in the evaluating device for the interpretation of the output signal of such a measured values pick-up and for the coordination of the physical measured value to the output signal. For this purpose these characteristic values must be entered mostly manually into the separate circuit or into the evaluating device. Such manual entering may, in practice, lead to erroneous entries or to confusing the corresponding data sheets. Thus, quite a number of pick-ups with connected electronic circuits are known in which the data sheet information or the calibration characteristic values of the pick-ups are permanently stored. The permanently stored information and values can be read-out by the connected evaluating device.

An electrical connector plug with an electronic data carrier is known from German Patent Publication DE 41 14 921 C2. The connector plug is connected with a temperature sensor as a physical-electrical transducer through four electrical conductors. Eight plug pins are provided in the electrical connector plug for transmitting the measured values and the characteristic values stored in the electronic data carrier to an evaluating device through these plug pins. Thereby, the memory is connected through four separate plug pins which are not needed for the measured signal, to the evaluating device. Thus, where there is a larger spatial distance between the thermoelement with its electrical connector plug and the evaluating device, separate conductors for the transmission of the characteristic values into the evaluating device would have to be provided. Such separate conductors entail a higher effort and expense for conductors, particularly for connecting a larger number of pick-ups to one evaluating device. Such extra conductors are frequently hard to integrate into present testing set-ups.

A pick-up for measuring physical values is known from EP 0,233,176 B1. The physical-to-electrical transducer of this pick-up is integrated into a structural unit with a programmable not volatile electronic memory for correction data. Thereby, the electrical pick-up signals and the memory data are supplied at a common output in a timed sequence to an evaluating circuit. The electronic circuit comprised in the pick-up structural unit is thereby so constructed that the measured data are converted prior to the transmission from analog-to-digital. EP 0,233,176 B1 does not describe in detail how the transmission of a strictly analog measured signal and of the memory data to a common output can be realized.

A further measured value pick-up is known from European Patent Publication EP 0,324,067 A2 which comprises measuring transducers in a bridge circuit and an integrated parameter source. The parameter source comprises an electronic memory circuit in which pick-up characteristic or correction values are programmably stored and from which these pick-up characteristic or correction values can be read-out in serial fashion. These pick-up characteristic or correction values can be read-out or can be newly programmed by an evaluating device through two measuring or power supply conductors. For this purpose the read-out procedure is controlled through a special third conductor between the pick-up and the evaluating circuit. The third conductor serves for initiating the read-out process for the correction data or for the measured value transmission. However, when using such pick-ups one more connecting conductor is required in any case for the characteristic value transmission compared to a conventional pick-up with analog interfaces. Thus, in connection with available measuring circuits an exchange of conventional pick-ups for pick-ups with a characteristic value read-out is not possible.

A measuring pick-up is known from European Patent Publication EP 0,541,573 B1 which pick-up is basically a further development of the pick-up according to EP 0,324,067 A2. In that measured value pick-up a so-called shunt control conductor is used for the control of the characteristic value transmission between the memory circuit and the evaluating device. Such a conductor is customarily present in certain types of pick-ups such as acceleration pick-ups. The measured value pick-up of EP 0,541,573 B1 thus describes a possibility to connect such a parameter source or its memory circuit to an evaluating device without additional conductors. However, in connection with measured value pick-ups which do not have such a shunt control conductor, this method is not useable or an additional control conductor is required.

SUMMARY OF THE INVENTION

It is the object of the invention to provide a measured values pick-up with a data memory for the connection to an evaluating device which does not require an additional control conductor between the pick-up and the evaluating device and which is exchangeable for a pick-up without a data memory.

An apparatus for measuring values according to the invention comprises a pick-up unit including a measured values pick-up and a data memory connected to said measured values pick-up, said apparatus further comprising an evaluating device and at least two electrical conductors forming a conductor pair connecting said evaluating device to said pick-up unit, said at least two electrical conductors having the same or approximately the same electrical potential during a measuring operation, whereby data predetermined by said evaluating device can be read-out from said data memory and/or can be recorded, wherein said data memory is constructed as a data memory module which is wired into said at least two electrical conductors forming said conductor pair having said same or approximately the same electrical potential during said measuring operation, said apparatus further comprising a current limiting circuit for switching said data memory module from said measuring operation to a communication mode for performing a data transmission, and wherein said pick-up unit comprising said data memory has at its disposal, in a three, four, five and six conductor technique, the same connector conductor number as a conventional pick-up without a data memory.

The method according to the invention comprises the following steps:
a) imposing a voltage on a pair of connector conductors having the same or approximately the same electrical potential, for switching from a measuring operation to a communication mode between said pick-up unit and an evaluating device,
b) limiting by said imposed voltage, a current in said pair of connector conductors to a small residual current which is maintained during a data exchange,
c) using said pair of connector conductors during said measuring operation as a power supply and/or for a transmission of measured values, and
d) using for said switching into the communication mode and for data transmission the same pair of conductors (2, 2'; 11, 12) which is also used for connecting said pick-up unit and said evaluating device and for a measured values acquisition and/or for a power supply in conventional two, three, four, five or six conductor technique circuits.

The invention has the advantage that due to the switch-over possibility from a measuring operation to a communication mode and due to the data transmission through conventional measuring and/or power supply conductors the measured values pick-up according to the invention can also be operated with an evaluating device having no data exchange possibility.

Due to the use of available measuring and/or power supply conductors for the switching over into the communication mode for the data transmission it is possible to exchange in existing measuring circuits the conventional pick-ups, in a simple manner, for pick-ups with data memories without the need for retooling or exchanging existing wiring or customary plug-in connections.

The invention is also useable in an advantageous manner for a multitude of different types of pick-ups because these pick-ups generally consist of physical-electrical transducers with variable resistances, which as a rule are wired as Wheatstone bridges in a three, four, five or six wire conductor technique for connection to a related evaluating device. All of these pick-ups then comprise practically currentless sensor conductors or wherein the power supply or measuring conductors can be switched to a currentless state.

Further, the invention has the advantage that with the aid of a simple current limiting circuit an existing conductor pair with the same electrical potential can be used for the data transmission. Such data transmission can be made in connection with pick-up power supply circuits with direct current or with carrier frequency a.c. current or voltage.

BRIEF DESCRIPTION OF THE DRAWINGS

The invention will be described in more detail with reference to an example embodiment which is shown in the drawings, wherein.

DETAILED DESCRIPTION OF THE INVENTION AND OF THE BEST MODE OF THE INVENTION

Figure 1:
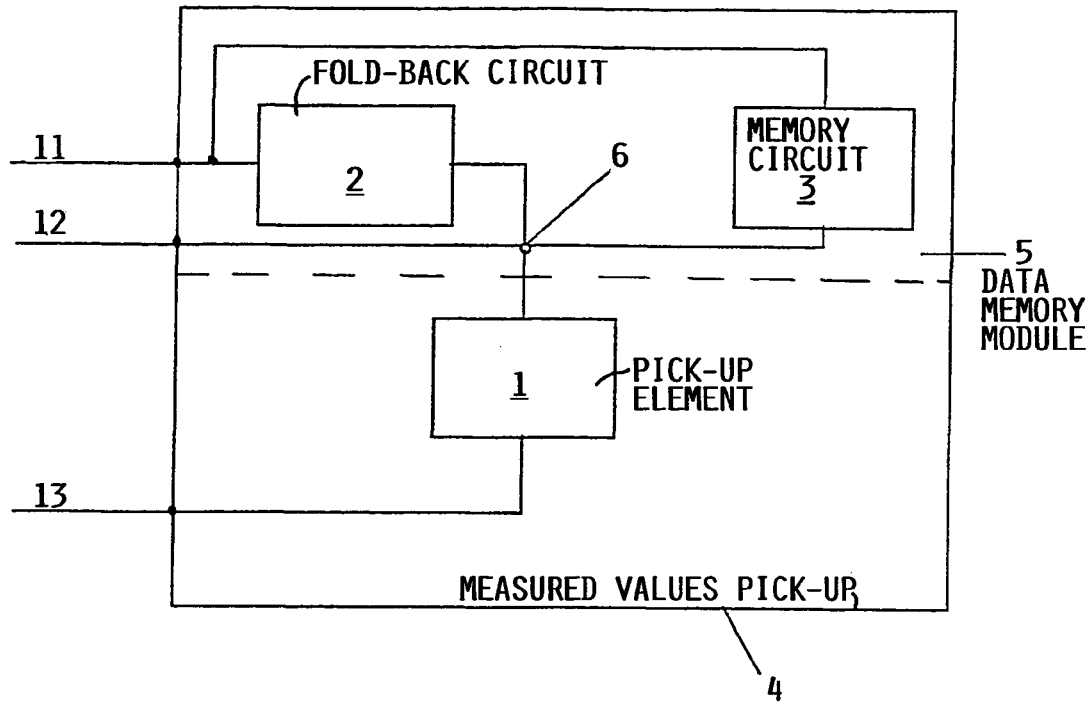
FIG. 1 shows a simplified block circuit diagram of a measured values pick-up with a connected data memory module.

A simplified block circuit diagram of a measured values pick-up 4 is shown in FIG. 1 of the drawing. The pick-up 4 comprises a pick-up element 1 and a data memory module 5, a fold-back circuit 2 and a memory circuit 3. The pick-up 4 is connected through three electrical conductors 11, 12, 13 with an evaluating circuit not shown.

Figure 4:
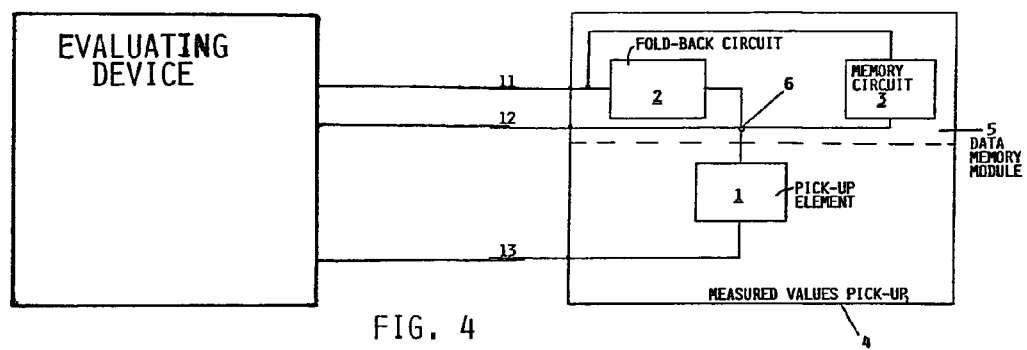
FIG. 4 is a block diagram showing the pick-up of FIG. 1 connected to an evaluating circuit.

The pick-up element 1 is a physical-electrical transducer which may, for example, comprise a strain gage which is applied to a deformable body. Such pick-up elements 1 are used as force pick-ups or as pressure pick-ups, whereby a bending stress at the deformable body is transduced into an electrical resistance change in the strain gage. An evaluating device is connected to the circuit of FIG. 1 as shown in FIG. 4 and ascertains from the resistance change a force or pressure measured value which is indicated or further processed. For this purpose, the pick-up element 1 may be connected to the evaluating device by a three conductor technique 11, 12, 13. The evaluating device evaluates the electrical, measured signal by means of a measuring bridge circuit.

Such an evaluating circuit which is connected through three conductors 11, 12, 13 with a strain gage pick-up element DMS is known from German Patent Publication DE 199 57 088 A1. During a measuring operation two conductors 11, 12 at the pick-up element 1 are at the same electrical potential. Thus, the two conductors 12 and 13 arranged directly at the pick-up element 1 constitute the measuring and the power supply conductors while the two conductors 11 and 12 connected with each other at the pick-up element and having the same potential, constitute a measuring and power supply conductor 12 and a sensor conductor 11. Thus, the pick-up element 1 is supplied with power through the power supply conductor 12 during a measuring operation. The sensor conductor 11 serves for ascertaining the supply voltage at the power supply and measuring conductor 12. With the help thereof the evaluating device controls in closed loop fashion the voltage drops caused by the conductor resistances and thus compensates these voltage drops. In the measuring state or in the measuring mode the conductor pair 11, 12 comprising the sensor conductor 11 and the measuring and power supply conductor 12 is used for the transmission of the measured signals and for the closed loop control of the power supply voltage drops on the measuring conductors.

If now for the evaluation of the measuring signals pick-up characteristic values or calibration data are to be transmitted to the evaluating device, a switch-over is performed from the measuring mode into a communication mode. For this purpose the evaluating device imposes a voltage onto the memory circuit 3 through the conductor pair 11 and 12 comprising the sensor conductor 11 and the measuring and power supply conductor 12. A large current would flow on these two conductors because in the conventional three conductor circuit the sensor conductor 11 and the power supply conductor 12 are directly connected with each other upstream of the pick-up element. This large current would be limited only by the conductor resistances. Therefore, an electronic current limiting circuit 2 is provided in the conductor pair 11 and 12 constituted by the sensor conductor 11 and the power supply conductor 12, upstream of the connection point 6 at the sensor element 1. The current limiting circuit 2 limits the current through a fold-back characteristic to a small residual current. Thus, the imposed voltage becomes available for the power supply of the memory circuit 3, whereby the memory circuit 3 switches over into the communication mode.

The conductor pair 11, 12 including the sensor conductor 11 and the power supply conductor 12 is used for the transmission of the data from the memory circuit 3 to the evaluating device. The energy for supplying the memory circuit 3 and the information from the memory circuit 3 are transmitted through this conductor pair 11 and 12. For this purpose, an integrated circuit produced by "Dallas" is used as a memory circuit 3 which operates in accordance with the "Dallas-1-wire protocol". Thus, no additional conductors are needed in the communication mode. However, further power supply and measuring conductors 13 provided for the measuring operation, may be used for the transmission of data between the evaluating device and the memory circuit 3. For this purpose the conductors 13 are switched off from the pick-up 4 by electronic circuit arrangements which are provided in the pick-up 4 and which connect the conductors 13 to the memory circuit 3. In this embodiment no additional conductors between the measured values pick-up 4 and the evaluating device are needed for the communication mode.

After the read-out of the characteristic value data and/or of the calibration data, the evaluating device performs a switch-back into the measuring mode in which the imposed voltage is again switched-off from the conductor pair 11, 12 of the sensor conductor 11 and the power supply conductor 12. In connection with the use of a programmable memory circuit 3 which, for example, may be constructed as an EPROM it is possible in the communication mode not only to read-out the content of the memory, but also to enter new characteristic values and/or calibration values.

If the current limiting circuit has been switched back into the measuring mode, then the acquisition of measured values takes place as in a measuring circuit without a connected data memory module 5. As a result, no special requirements must be met by the signals on the conductors 11 and 12 in the measuring mode. It is merely necessary to make sure that no voltage is imposed by the evaluation electronics on the used sensor power supply conductor pair 11 and 12. This requirement is always met if one of the two conductors 11 and 12 is wired as an input signal in the measuring mode. Particularly, the pick-up 4 with the connected data memory module 5 is also suitable for a carrier frequency power supply as well as for current and voltage power supplies with different amplitudes. The characteristic of the current limiting circuit 2 makes sure that the measuring operation is not impaired. In this connection a certain electrical impedance of this circuit 2 does not pose any problem in the measuring operation because the circuit 2 is provided in the sensor conductor 11 in which during the measuring operation only negligible current values occur.

The above described measured values pick-up 4 with the connected data memory module 5 comprises a pick-up element 1 with a strain gage which is wired as a quarter bridge and connected with the evaluating device through two measuring and power supply conductors 12 and 13 and through one sensor conductor 11. Thereby, the remaining supplemental resistance of the full bridge are arranged in the evaluating device and wired as a full bridge with the pick-up element 1. In connection with such pick-up elements 1 four conductor circuits are also known in which, in addition to the measuring and the power supply conductors 12 and 13, two sensor conductors 11 are provided, whereby each controls in closed loop fashion the voltage drop on one of the measuring and power supply conductors 12 and 13. The use of the above described data memory module is also possible for such a four conductor circuit as has been described above.

In connection with strain gage pick-ups five and six conductor circuits are known in which the pick-up element 1 comprises several strain gages (DMS), wherein the pick-up element is wired as a half bridge or as a full bridge. Sensor conductors 11 are also provided for these multi-conductor circuits in addition to the power supply conductors 12 and 13 so that thereby always one pair of sensor power supply conductors 11, 12 can be used for the connection of the data memory module 5. However, such data memory modules 5 are also useable in connection with inductive half bridge circuits as are provided for measured values pick-ups which are being used as displacement pick-ups. Furthermore, the measured values pick-up 4 can also be constructed as a temperature sensor in which the physical-electrical transducer elements are temperature sensitive resistances which are wired as a Wheatstone bridge. These circuits also require sensor conductors 11 for the compensation of the voltage drop on the connecting conductors between the sensor element 1 and the evaluating device. These sensor conductors 11 may be used in connection with a power supply conductor for the connection of the data memory module 5.

However, such temperature sensors can also be constructed with a thermoelement, whereby between the evaluating device and the thermoelement only one conductor pair is needed. Since with one thermoelement only a very small voltage is produced, one can assume that the electrical potential at the pick-up element 1 is the same, said potential being suitable for switching on a data memory module 5. Thus, the use of the above described data memory modular circuit 5 is possible for a multitude of pick-up elements 1. Accordingly, most analog measured values pick-ups in use today can be equipped with the present data memory module. Such measured values pick-ups may have a spatial distance form their evaluating device and which are to be equipped or retrofitted with a characteristic value memory and/or with a calibration data memory which can be read out. The automatic read-out and/or programming of such characteristic values and/or calibration values is/are an advantage particularly in connection with a further digital processing of the measured signals in the evaluating device.

Figure 2:
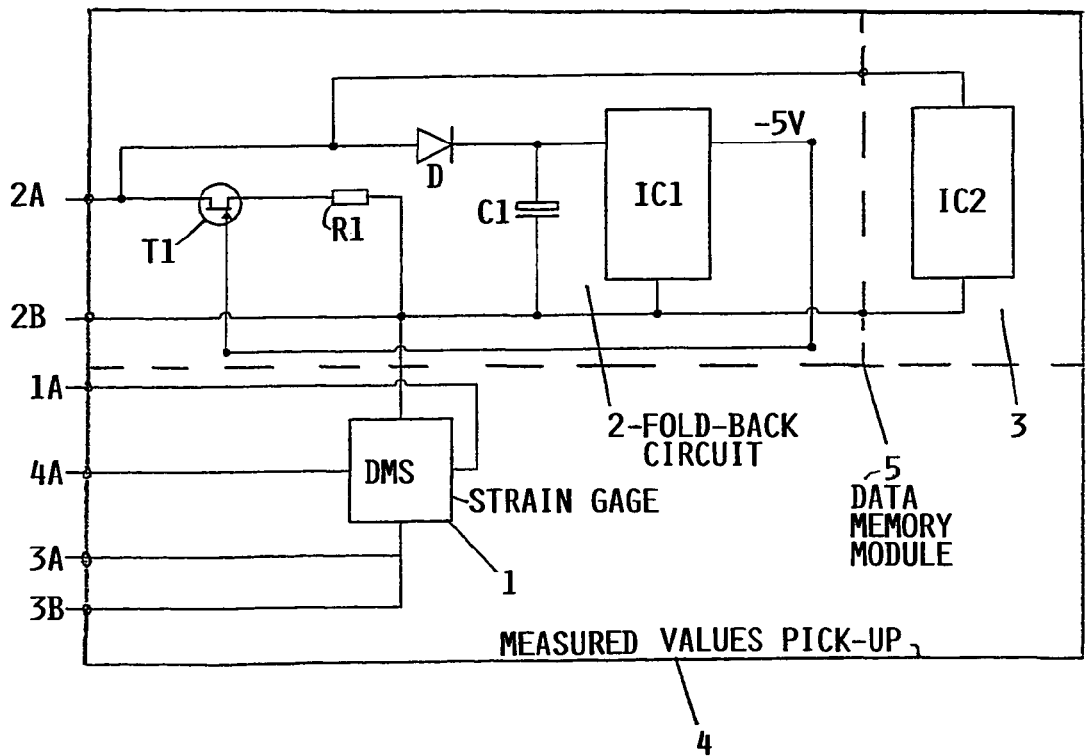
FIG. 2 shows a simplified circuit diagram of the measured values pick-up with an integrated data memory module.

A special embodiment of the data memory module 5 in the form of a circuit diagram is shown in FIG. 2 of the drawing. Therein, a measured values pick-up is provided which is connected with an evaluating device not shown, through a six conductor technique 1A, 2A, 2B, 3A, 3B, 4A. A pick-up element 1 is involved that comprises at least four strain gages (DMS) which are wired as a full bridge, as, for example, in a high precision weighing cell or in a force transducer. This measured values pick-up 4 comprises two power supply conductors 2A, 3A, two sensor conductors 2B, 3B and two measuring conductors 1A, 4A which are connected with the evaluating device. The circuit of the data memory module 5 is provided in one sensor power supply conductor pair 2A, 2B, whereby this conductor pair 2A, 2B is used in the measuring mode for the closed loop control of the bridge power supply circuit of the full bridge pick-up 1. The current limiting circuit 2 of this data memory module 5 comprises substantially the IC1 functioning as a voltage transformer, a field-effect transistor T1, a resistor R1, a diode D and a capacitor C1. These components are wired into the sensor voltage supply pair 2B, 2A. The resistor R1 of about 100 ohm and the field-effect transistor T1 do not disturb the measuring operation because the conductor 2B is used as a sensor conductor and thus only negligibly small currents are flowing.

Figure 3:
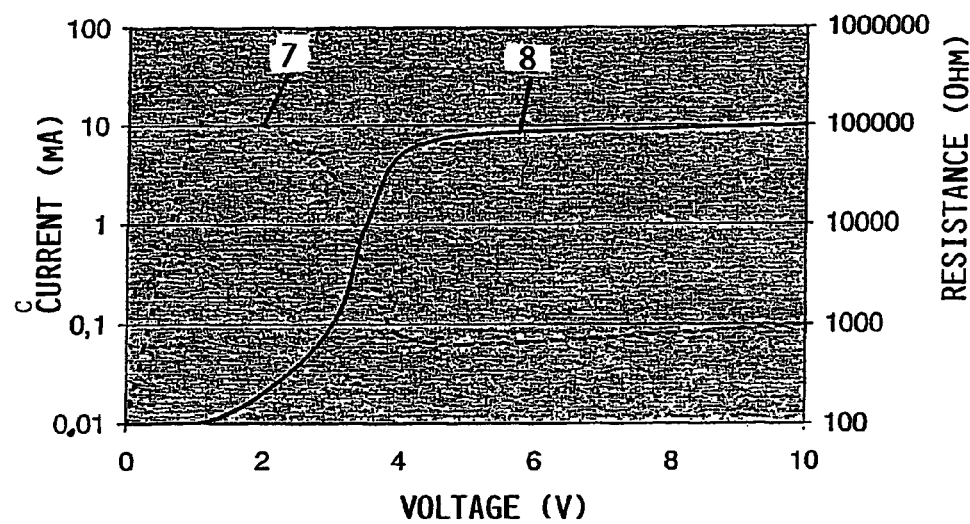
FIG. 3 shows a fold-back characteristic curve for current limiting in the communication mode.

During the communication mode the evaluating device imposes a voltage of 5 volts on the conductor pair 2A, 2B. The voltage transformer IC1 converts this voltage into a negative voltage of −5V which switches the field-effect transistor T1 to its high impedance state whereby the current is limited in accordance with a fold-back characteristic curve. FIG. 3 of the drawing shows for example such a fold-back curve 7 in a coordinate system. Therein the current is shown as a function of the voltage by a dotted characteristic curve and the resistance is shown as a function of the voltage by a full line characteristic curve in the coordinate system. One recognizes therefrom that the current initially rises up to above 10 mA when the evaluating device imposes the voltage and that the current drops to a relatively constant value of 0.1 mA when the voltage is switched to about 4 volts. This small residual current does not impair the power supply to and the readout from the data memory IC2. The diode D and the capacitor C1 are provided to make sure that the field-effect transistor T1 in its high impedance state maintains the current limitation when a voltage reduction of short duration occurs in the conductor pair 2A, 2B as is the case during data exchange with the memory circuit 3.

The memory circuit 3 comprises substantially an integrated semiconductor module IC2 which is available, for example, from "Dallas Semiconductor" and which makes possible a data exchange in accordance with the "Dallas-1-wire-protocol". Thus, the semiconductor memory IC2 requires for the power supply and for the data exchange only one conductor pair. Thus, the memory IC2 is also wired into the sensor power supply conductor pair 2A, 2B. The circuit functions in the communication mode as described above in detail with reference to FIG. 1 of the drawings.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for measuring values comprising a pick-up unit including a measured values pick-up and a data memory connected to said measured values pick-up, said apparatus further comprising an evaluating device and at least two electrical conductors forming a conductor pair connecting said evaluating device to said pick-up unit, said at least two electrical conductors having the same or approximately the same electrical potential during a measuring operation, whereby data predetermined by said evaluating device can be read-out from said data memory and/or can be recorded, wherein said data memory is constructed as a data memory module which is wired into said at least two electrical conductors forming said conductor pair having said same or approximately the same electrical potential during said measuring operation, said apparatus further comprising a current limiting circuit for switching said data memory module from said measuring operation to a communication mode for performing a data transmission, and wherein said pick-up unit comprising said data memory has at its disposal, in a three, four, five and six conductor technique for connecting said evaluating device to said pick-up unit, the same connector conductor number as a conventional pick-up without a data memory.

2. The apparatus of claim 1, wherein said data memory module comprises said current limiting circuit and a memory circuit for inputting and/or read-out of predeterminable characteristic value data and/or calibration data.

3. The apparatus of claim 1, wherein said pick-up unit comprises at least one pick-up element for performing a physical-electrical transformation, and wherein said pick-up element forms a structural unit with said data memory module or is arranged in a local vicinity of said data memory module.

4. The apparatus of claim 3, wherein said at least one pick-up element comprises strain gages or variable resistors for performing said physical-electrical transformation, and wherein said strain gages or variable resistors are wired as a Wheatstone bridge, said apparatus further comprising three, four, five or six conductors connecting said Wheatstone bridge to said evaluating device.

5. The apparatus of claim 3, wherein said at least one pick-up element is constructed as a thermoelement or as an inductive pick-up which is connected to said evaluating device through at least two conductors.

6. The apparatus of claim 1, wherein said current limiting circuit is so constructed that a switch-over to a residual current limiting is performed by said evaluating device through a voltage imposed on said conductor pair having said same or approximately the same electrical potential, said switch-over being performed in accordance with a fold-back characteristic which constitutes a communication mode.

7. The apparatus of claim 1, wherein said evaluating device is so constructed that in said communication mode data stored in said memory module can be read out and/or new data can be inputted by said evaluating device into said memory module.

8. The apparatus of claim 1, wherein said current limiting circuit comprises at least one voltage transformer, a field-effect transistor, a resistor, a diode and a capacitor which are connected in a sensor conductor or in a voltage free measuring conductor.

9. The apparatus of claim 1, wherein said data memory module comprises a memory circuit including an integrated circuit constructed for data transmission in accordance with a Dallas-1-wire protocol.

10. The apparatus of claim 1, wherein said conductor pair is provided for switching over into said communication mode and for a data exchange, said conductor pair simultaneously functioning as a power supply to said pick-up unit and/or for a measured value acquisition during said measuring operation.

11. A method for the acquisition of measured values and for exchanging data with a measured values pick-up unit comprising the following steps:

a) imposing a voltage on a pair of connector conductors having the same or approximately the same electrical potential, for switching from a measuring operation to a communication mode between said pick-up unit and an evaluating device, b) limiting, by said imposed voltage, a current in said pair of connector conductors to a small residual current which is maintained during a data exchange, c) using said pair of connector conductors during said measuring operation as a power supply and/or for a transmission of measured values, and d) using for said switching into the communication mode and for data transmission the same pair of conductors which is also used for connecting said pick-up unit said evaluating device and for at least one of a measured values acquisition or a power supply, in conventional two, three, four, five and six conductor technique circuits.

12. The method of claim 11, further comprising supplying power to said pick-up unit as one of a d.c. voltage, a d.c. current, a carrier frequency voltage and a carrier frequency current.

13. A method for the acquisition of measured values and for exchanging data with a measured values pick-up unit comprising the following steps:

a) imposing a voltage on a pair of connector conductors having the same or approximately the same electrical potential, for switching from a measuring operation to a communication mode between said pick-up unit and an evaluating device, b) limiting, by said imposed voltage, a current in said pair of connector conductors to a small residual current which is maintained during a data exchange, c) using said pair of connector conductors during said measuring operation as a power supply and/or for a transmission of measured values, and d) connecting in parallel a plurality of measured value pick-ups each comprising a respective memory module, and reading out data from each said respective memory module by said evaluating device provided in common for all said respective memory modules.

* * * * *

UNITED STATES PATENT AND TRADEMARK OFFICE
CERTIFICATE OF CORRECTION

PATENT NO. : 7,016,792 B2 Page 1 of 1
APPLICATION NO. : 10/481506
DATED : March 21, 2006
INVENTOR(S) : Schneider It is certified that error appears in the above-identified patent and that said Letters Patent is hereby corrected as shown below:

<u>Column 7,</u>
Line 33, after "and the", replace "readout" by --read-out--;

<u>Column 9,</u>
Line 12, after "unit", insert --with--.

Signed and Sealed this

First Day of August, 2006

JON W. DUDAS
*Director of the United States Patent and Trademark Office*